(12) United States Patent
Ding et al.

(10) Patent No.: US 10,134,040 B2
(45) Date of Patent: Nov. 20, 2018

(54) SYSTEMS AND METHODS FOR LARGE-SCALE TESTING ACTIVITIES DISCOVERY

(71) Applicant: Visa International Service Association, San Francisco, CA (US)

(72) Inventors: Charles Ding, San Carlos, CA (US); Aoyu Chen, San Jose, CA (US); Suyun Xu, Foster City, CA (US); Kevin Siegel, Mountain View, CA (US)

(73) Assignee: Visa International Service Association, San Francisco, CA (US)

( * ) Notice: Subject to any disclaimer, the term of this patent is extended or adjusted under 35 U.S.C. 154(b) by 415 days.

(21) Appl. No.: 14/263,654

(22) Filed: Apr. 28, 2014

(65) Prior Publication Data
US 2014/0324699 A1    Oct. 30, 2014

Related U.S. Application Data

(60) Provisional application No. 61/816,553, filed on Apr. 26, 2013.

(51) Int. Cl.
*G06Q 40/00* (2012.01)
*G06Q 20/40* (2012.01)

(52) U.S. Cl.
CPC ................ *G06Q 20/4016* (2013.01)

(58) Field of Classification Search
CPC ............................ G06Q 20/4016
See application file for complete search history.

(56) References Cited

U.S. PATENT DOCUMENTS

| | | | | |
|---|---|---|---|---|
| 6,330,546 | B1* | 12/2001 | Gopinathan | G06Q 20/00 705/35 |
| 8,140,301 | B2* | 3/2012 | Abe | G05B 17/02 703/2 |
| 2010/0005013 | A1 | 1/2010 | Uriarte | |
| 2011/0225076 | A1 | 9/2011 | Wang et al. | |
| 2011/0238510 | A1* | 9/2011 | Rowen | G06K 9/00187 705/16 |
| 2013/0024376 | A1* | 1/2013 | Choudhuri | G06Q 20/4016 705/44 |

* cited by examiner

*Primary Examiner* — Scott S Trotter
(74) *Attorney, Agent, or Firm* — Kilpatrick Townsend & Stockton LLP

(57) ABSTRACT

Embodiments of the invention relate in part to determining a testing model and providing a testing transaction score for transactions. The testing transaction score may indicate a likelihood that the transaction is a testing transaction. One embodiment of the invention discloses a method comprising receiving a first authorization message for a first transaction using an account, determining a testing transaction score for the first transaction using a testing model, and determining that the first transaction is a testing transaction based on the testing transaction score, wherein the testing transaction score for the first transaction is used for declining a second transaction using the same account conducted after the first transaction.

17 Claims, 11 Drawing Sheets

SYSTEMS AND METHODS FOR LARGE-SCALE TESTING ACTIVITIES DISCOVERY

CROSS-REFERENCES TO RELATED APPLICATIONS

The present application is a non-provisional application of and claims priority to U.S. Provisional Application No. 61/816,553, filed on Apr. 26, 2013, the entire contents of which are herein incorporated by references for all purposes.

BACKGROUND OF THE INVENTION

In recent years, payment account information has become a significant target for identity thieves and other fraudulent parties. Fraudulent parties that gain access to payment account information may conduct testing transactions—seemingly inconspicuous transactions used to validate the payment account information. For example, an identity thief may steal credit card information. The identity thief may then use the credit card information to pay for a testing transaction of a small amount such as a $2 download of a song. If the transaction succeeds, the identity thief has confirmed that the stolen credit card account information is valid. The thief may then use the credit card information to conduct higher-value transactions (e.g., a $400 transaction at a jeweler), or sell the account information with an assurance to the buyer that the account is valid.

Embodiments of the present invention address these problems and other problems individually and collectively.

BRIEF SUMMARY OF THE INVENTION

Embodiments of the invention relate in part to determining a testing model and providing a testing transaction score for transactions. The testing transaction score may indicate a likelihood that the transaction is a testing transaction.

One embodiment of the invention discloses a method. The method comprises receiving a first authorization message for a first transaction using an account, determining a testing transaction score for the first transaction using a testing model, and determining that the first transaction is a testing transaction based on the testing transaction score, wherein the testing transaction score for the first transaction is used for declining a second transaction using the same account conducted after the first transaction.

Another embodiment of the invention discloses a server computer. The server computer comprises a processor and a non-transitory computer readable medium, comprising code executable by the processor for implementing a method comprising receiving a first authorization message for a first transaction using an account, determining a testing transaction score for the first transaction using a testing model, and determining that the first transaction is a testing transaction based on the testing transaction score, wherein the testing transaction score for the first transaction is used for declining a second transaction using the same account conducted after the first transaction.

DETAILED DESCRIPTION OF THE INVENTION

Figure 1:
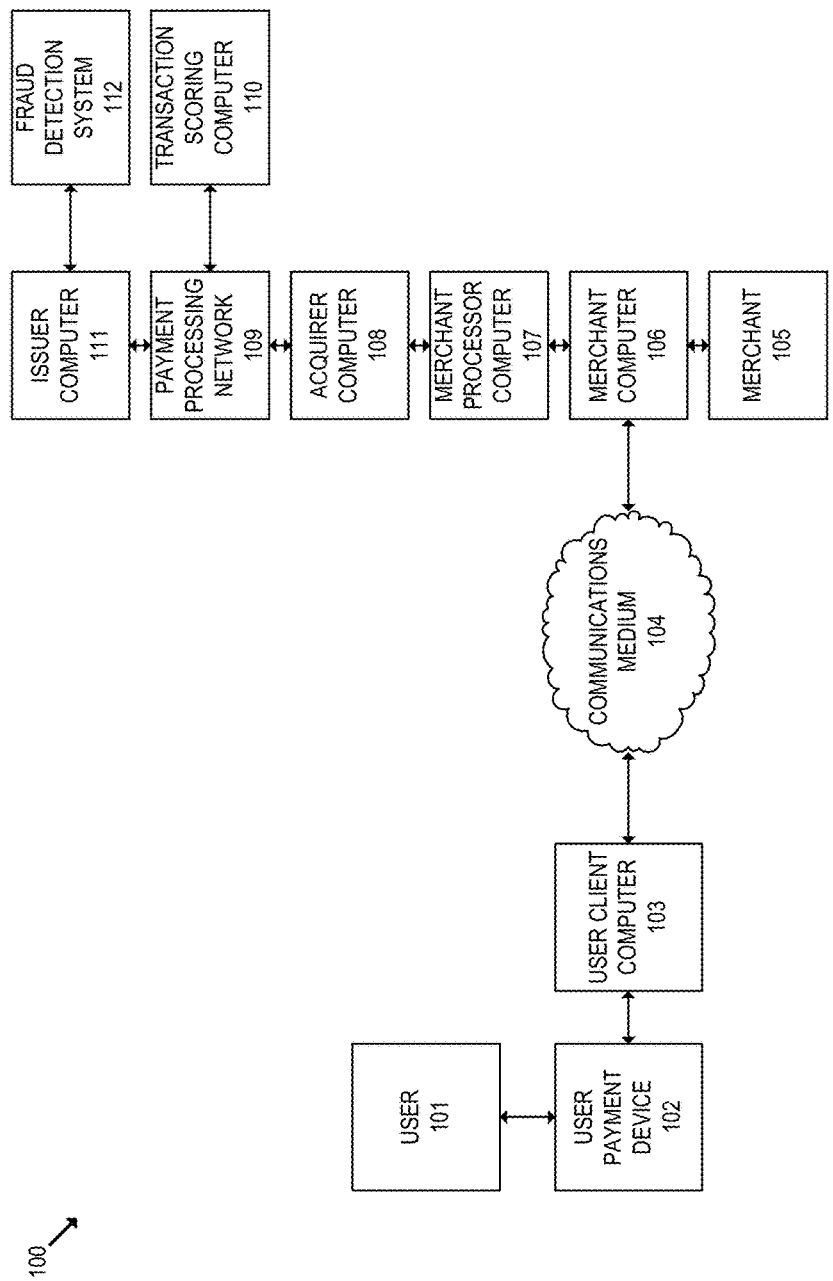
FIG. 1 shows a system for conducting transactions according to embodiments of the invention.

Prior to discussing embodiments of the invention, description of some terms may be helpful in understanding embodiments of the invention.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "testing transaction" may include any transaction used to test if an account is valid and usable for payment transactions. In various cases, a testing transaction may involve an authorization hold on an account, a payment authorization request message, a settlement message, or any other suitable actions or messages involved with a financial transaction. In some cases, a testing transaction may be performed by a fraudulent party before performing a target transaction that the fraudulent party ultimately desires to perform, such as a higher-value fraudulent transaction. In other cases, a testing transaction may be performed by a fraudulent party prior to selling payment account information.

Testing transactions may often be designed to be inconspicuous such that an account holder would be unaware of the testing transaction or would not be alerted by the testing transaction. In one example, a testing transaction may include swiping a stolen credit card at an automated fuel dispenser point of sale (POS) terminal at a gas station. Typically, the POS terminal at the gas station will attempt to place an authorization hold on the credit card account for some pre-defined value (e.g., $100). If the hold is authorized, the fuel dispenser indicates that fuel may be pumped, and the thief may conclude that the credit card is valid without actually carrying out the purchase. In this manner, an account holder may be unaware that such a testing transaction ever took place. As another example, a fraudulent party may conduct a testing transaction for a small amount at a popular online retailer (e.g., $2 at the iTunes™

Store), so that the likelihood of the account holder noticing the transaction or being alerted by the transaction is reduced.

Additionally, in some cases, testing transactions may be associated with an unscrupulous or compromised merchant. For example, fraudsters may establish a fraudulent merchant for the purpose of conducting testing transactions using stolen or misappropriated financial account information. Alternatively, fraudsters may hack into a legitimate merchant to conduct testing transactions. Embodiments of the present invention relate to identifying the likelihood that a transaction is a testing transaction using these and other patterns.

In some cases, a transaction may be considered a "candidate testing transaction". A candidate testing transaction may include any transaction which is determined to be suspicious, unusual, or otherwise indicative of being a potential testing transaction. In some cases, a transaction may be considered an "ascertained testing transaction". An ascertained testing transaction may include any transaction which satisfies the criteria for being an actual testing transaction. For example, a candidate testing transaction may be considered an ascertained testing transaction if a user reported a fraudulent transaction shortly after the testing transaction occurred. In some embodiments of the invention, ascertained testing transactions may be considered as a confirmed testing transactions for model training purposes. Typically, some, but not all, candidate testing transactions are determined to be ascertained testing transactions. Candidate testing transactions that are not determined to be ascertained testing transactions may be referred to as "non-testing transactions".

As used herein, a "testing transaction score" may include a score, value, or indicator used to indicate the likelihood that a transaction is a testing transaction. The testing transaction score may be determined by a payment processing network, issuer, acquirer, acquirer processor, or any other suitable entity. In various embodiments, the testing transactions score may be provided to an issuer in substantially real-time or in a batch format (e.g., daily).

A "testing model" may include any model, classifier, or other algorithm used to determine the likelihood that a transaction is a testing transaction. In some embodiments, a testing model can be a learning model that adapts its effectiveness over time. A testing model may be implemented using any suitable technique and/or machines, such as a support vector machine (SVM), a Bayesian classifier, a decision tree, or a neural network. Some testing models may provide a quantitative indication of the likelihood (e.g., a score between 0 and 99). Other testing models may simply flag certain transactions as testing transactions. Testing models may use any suitable data as input. For example, a testing model may use transaction information received in an authorization message or settlement message for a transaction to determine if the transaction is a testing transaction. In some cases, a testing model may use as input features generated from the transaction information.

A "feature" may include any data element or field that may be used as an input into a model. A feature may be, for example, transaction attributes such as data fields included in an authorization message. Examples of transaction attributes may include the amount of a transaction, the merchant category code (MCC) for a transaction, or the date on which a transaction was conducted. A feature may also be calculated or otherwise derived from one or more features (i.e., a "multi-level feature"). Examples of multi-level features may include the transaction volume of an account over a period of time, the relative frequency of transactions at a particular MCC for an account, and the distribution of transaction amounts over time.

Embodiments of the invention relate to classifying transactions as testing transactions, generating a testing model using known testing transactions, providing a testing transaction score for transactions, and using the testing transaction score to detect or prevent fraud.

Embodiments of the invention provide effective detection of testing transactions. Although testing transactions are often conducted by fraudulent entities, in many aspects they differ from those detected by typical fraud detection systems. For example, fraud detection systems often consider high-frequency or high-value transactions to be suspicious, whereas testing transactions are often low-frequency and low-value. In addition, transactions conducted at unusual merchants may be flagged by a typical fraud detection system, whereas testing transactions are often conducted at popular and commonly used merchants. Thus, attempts to generally detect fraudulent transactions lead to less effective detection of testing transactions, leading to a higher likelihood of fraud. In contrast, embodiments of the invention recognize the recurring pattern of a testing transaction followed by a high-value fraudulent transaction, and generate a testing model that is used to provide a testing transaction score for each transaction. This allows the likelihood that a transaction is a testing transaction to be determined and used to trigger fraud preventing measures before a high-value transaction is attempted. Thus, embodiments of the invention provide more effective detection and prevention of fraudulent transactions, even before such transactions are conducted.

Embodiments of the invention additionally enable prior testing transactions by an account to be considered in a fraud detection system while processing a subsequent transaction. For example, in some embodiments, a first transaction may have a high testing transaction score. If a subsequent transaction is suspicious for other reasons, the transaction may then be declined. However, if the first transaction had a low testing transaction score, the transaction may be approved. Thus, even if the testing transaction was approved, the testing transaction score for a transaction may be used to deny subsequent transactions. Thus, embodiments of the invention can effectively detect fraud occurring over multiple transactions.

Embodiments of the invention further enable automatically updating the testing model with transactions scored using the testing model. For example, in some embodiments, scored transactions may be re-evaluated after a time period (e.g., 90 days). If the testing transaction score for the transaction was low, but the account conducting the transaction was later marked for fraud, then the testing model may be updated with the new transaction. Analogously, if the testing transaction score for the transaction was high, but no fraud was reported for the account conducting the transaction, the testing model may also be updated with the new transaction. Thus, by analyzing prior scores, embodiments of the invention can automatically adapt to new fraud patterns and trends.

The above examples highlight only a few of many advantages of using a testing model to generate testing transaction scores in accordance with embodiments of the invention.

I. Exemplary Systems

Example embodiments are typically implemented in the context of a financial transaction processing system. Therefore, prior to discussing methods for detecting testing transactions, a brief description of transaction processing will be presented.

FIG. 1 shows an exemplary system 100 for transaction processing. The system 100 includes a user 101, a user payment device 102, a user client computer 103, a communications medium 104, a merchant 105, a merchant computer 106, a merchant processor computer 107, an acquirer computer 108, a payment processing network 109, a transaction scoring system 110, an issuer computer 111, and a fraud detection system 112. Each of entities 101-112 may be implemented using one or more computers.

In a typical transaction, a user 101 may purchase goods or services at a merchant 105 associated with a merchant computer 106 using a user payment device 102. The transaction details are then sent to the merchant processor computer 107 and to the acquirer computer 108. The acquirer computer 108 can communicate with an issuer computer 111 via a payment processing network 109 for transaction processing. The issuer computer 111 may approve or decline the transaction depending, for example, on a transaction score provided by transaction scoring computer 110, or a detection of fraud by fraud detection system 112.

For simplicity of illustration, a certain number of components are shown in FIG. 1. It is understood, however, that embodiments of the invention may include more than one of each component. In addition, some embodiments of the invention may include fewer than all of the components shown in system 100. The components shown in system 100 may communicate via any suitable communication medium (such as the internet), using any suitable communication protocol.

The user client computer 103 may communicate with the merchant computer 106 via a communications medium 104, such as a network (e.g., the Internet).

The user 101 may be an individual or an organization (e.g., a business) that is capable of purchasing goods or services. The merchant 105 may represent a merchant, merchant employee, merchant device, or other entity that interfaces with merchant computer 106.

The user 101 can use the user client computer 103, which is communicatively coupled to the merchant computer 106 via the communications medium 104 in order to conduct a transaction with the merchant 105. The user client computer 103 may be in any suitable form. Example of user client computers 103 include any device capable of accessing the Internet, such as a personal computer, cellular or wireless phones, personal digital assistants (PDAs), tablet PCs, and handheld specialized readers. The user client computer 103 transmits data through the communications medium 104 to the merchant computer 106. In some embodiments of the invention, the user payment device 102 and the user client computer 103 may be a single device.

In some embodiments of the invention, a payment processing network 109 may communicate with a transaction scoring computer 110. The payment processing network 109 may send information regarding a transaction to the transaction scoring computer 110 and receive a transaction score, such as a testing transaction score, from the transaction scoring computer 110. In some embodiments, the payment processing network 109 may also use the received transaction scores to approve, decline, or otherwise perform actions on other transactions.

In some embodiments of the invention, an issuer may use an issuer computer 111 to communicate with fraud detection system 112. The issuer computer 111 may send transaction information to fraud detection system 112 and receive an indication from fraud detection system 112 of whether the transaction is likely fraudulent. Issuer computer 111 may approve, decline, or otherwise perform actions on a transaction depending on the indication received from the fraud detection system 112.

It should be noted that although FIG. 1 shows one possible embodiment of a payment system 100, embodiments may include fewer than, more than, and/or a rearrangement of the entities shown. For example, in some embodiments, fraud detection system 112 can be integrated with payment processing network 109, acquirer computer 108, merchant processor computer 107, and/or another entity. In some embodiments, transaction scoring computer 110 can be integrated with issuer computer 111, acquirer computer 108, merchant processor computer 107, and/or another entity.

Figure 2:
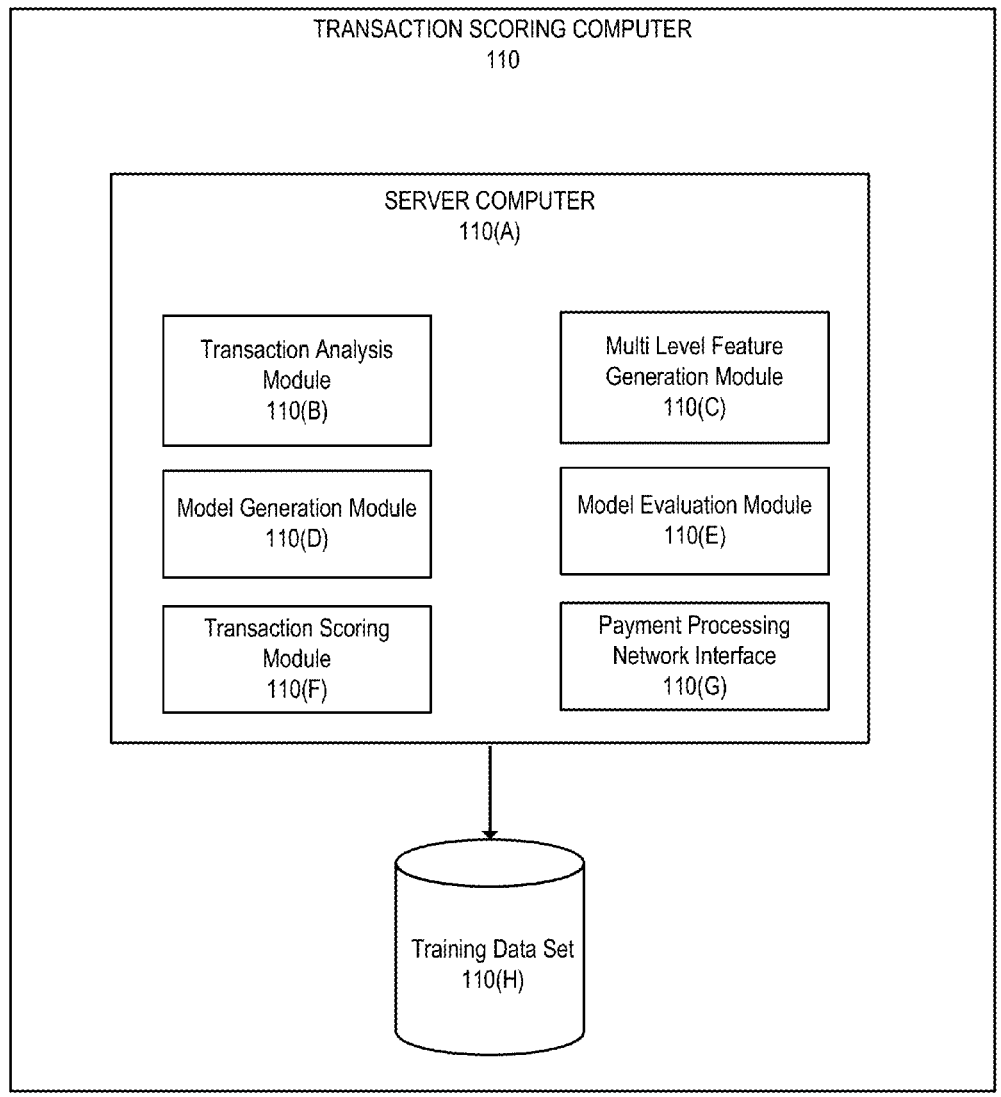
FIG. 2 shows an example of a transaction scoring system.

FIG. 2 shows a block diagram of an example of a transaction scoring computer 110 according to some embodiments of the invention. Transaction scoring computer 110 may comprise a server computer 110(A) comprising a transaction analysis module 110(B), a multi-level feature generation module 110(C), a model generation module 110(D), a model evaluation module 110(E), a transaction scoring module 110(F), and a payment processing network interface 110(G). The various modules may be implemented as computer code, residing on computer readable media.

The server computer 110(A) may be operatively coupled to one or more databases. The one or more databases may comprise, for example, a training data set 110(H).

Transaction analysis module 110(B) is configured to handle the analysis and identification of testing transactions and non-testing transactions. Transaction analysis module 110(B) may examine various data associated with a transaction. For example, transaction analysis module 110(B) may examine a transaction amount, a merchant at which the transaction is conducted, a merchant category code (MCC) of the merchant, an acquirer of the merchant, an issuer of the user conducting the transaction, an electronic commerce indicator (ECI), or any other suitable data to determine suspicious transactions. In some embodiments, transaction analysis module 110(B) may be used to classify a transaction as a candidate testing transaction or a non-testing transaction. Transaction analysis module 110(B) may be further used to classify a candidate transaction as an ascertained testing transaction by determining if fraud was reported for the account used in the candidate transaction within a predetermined time period (e.g., a day, a month, 90 days, a year, etc.) of the candidate transaction.

Multi level feature generation module 110(C) is configured to determine features that highly correlate with testing transaction activity. Multi level feature generation module 110(C) may use any suitable algorithm for determining features. For example, the Kullback-Leibler divergence (i.e., information gain) of a feature (e.g., merchant category code, transaction amount, whether the transaction is card present, etc.) may be used to measure the degree to which the feature is predictive of testing activity. If the feature is highly predictive, it may be used as a feature for a testing model. However, if the feature is not predictive, it may be ignored for the purposes of training a testing model. After examining one or more features and/or combinations of features, multi level feature generation module 110(C) may identify features and/or combinations of features that are highly predictive of testing transaction activity. The identified features may be used to generate a testing model.

Model generation module 110(D) is configured to generate a testing model. The testing model may be generated using any suitable method. For example, in some embodiments, if the testing model is a Bayesian classifier, the testing model may be generated by determining the probabilities of outcomes for one or more features. In some embodiments, if the model is a support vector machine, the model may be determined using a kernel function.

Model evaluation module 110(E) is configured to evaluate a testing model. Evaluating the testing model may involve, for example, determining the effectiveness of the testing model in correctly identifying testing transactions and non-testing transactions. For example, a testing model may be determined to have high sensitivity (i.e., a high true positive rate), and high specificity (i.e., a low false positive rate). Evaluating the testing model may also include determining the computational speed and efficiency of the testing model. In some embodiments, model evaluation module 110(E) may maintain a pre-determined performance threshold, such that only testing models exceeding the performance threshold are approved for use. The performance threshold may include, for example, lower bounds for specificity and sensitivity, and upper bounds for classification time and resource usage.

Transaction scoring module 110(F) is configured to generate a testing transaction score for testing transactions using the testing model. For example, in some embodiments, transaction scoring module 110(F) may be used to score transactions as they are received by payment processing network. In addition, in some embodiments, transaction scoring module 110(F) may be used to score transactions in a batch process.

Payment processing network interface 305 may be configured to communicate with acquirer computer 104, payment processing network 105, and issuer computer 106. For example, payment processing network interface 305 may include an internet address of an acquirer computer 104 associated with sending bank computer 300.

Training data set 110(H) may include any data used to generate or validate the testing model. The training data set 110(H) may comprise, for example, one or more transactions and various attributes of those transactions (e.g., the account used, amount, MCC, time, date, etc.). The training data set 110(H) may also include an indication of whether the account used to conduct the transaction was later reported for fraud or was otherwise compromised.

Figure 3:
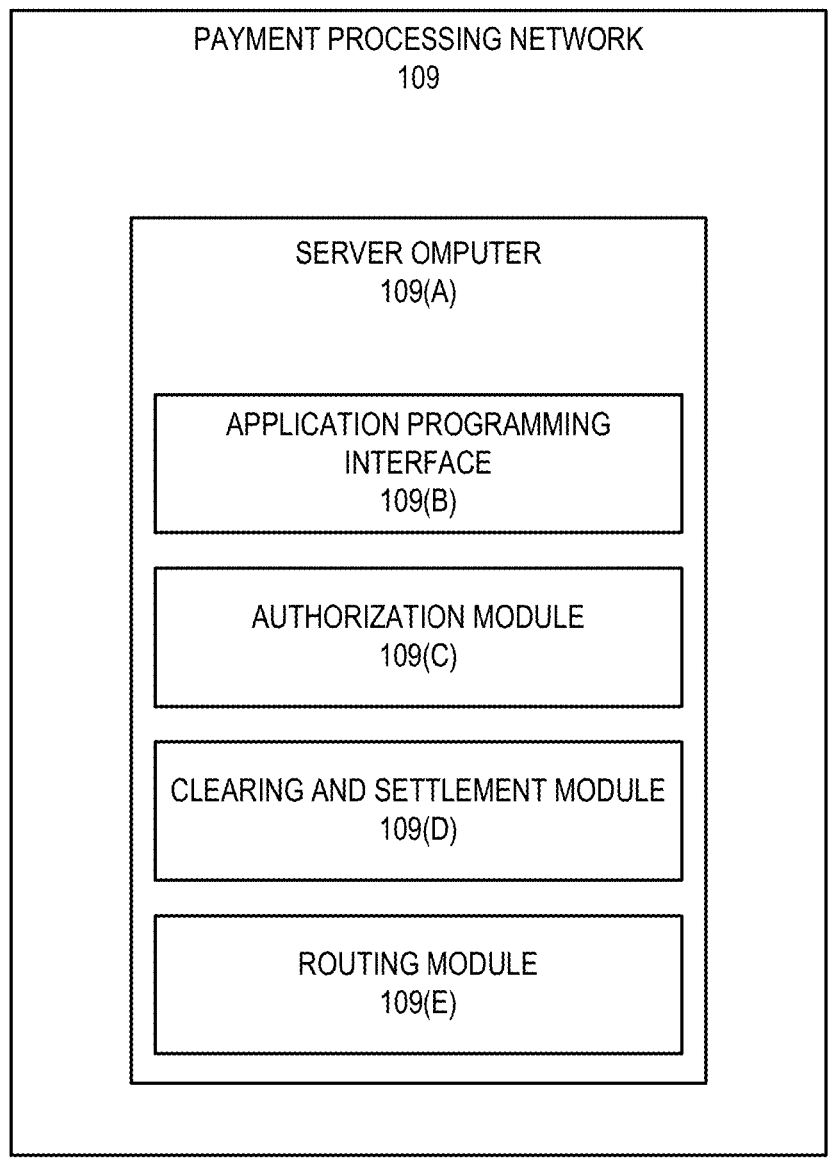
FIG. 3 shows an example of a merchant processor computer.

FIG. 3 shows an example of a payment processing network 109 according to embodiments of the invention. Payment processing network 109 may include one or more server computers, e.g., a server computer 109(A) comprising an application programming interface 109(B), an authorization module 109(C), a clearing and settlement module 109(D), and a routing module 109(E). The various modules may be implemented as computer code, residing on computer readable media.

As noted above, the payment processing network 109 may have or operate at least a server computer 109(A). The server computer 109(A) may be coupled to the database and may include any hardware, software, other logic, or combination of the preceding for servicing the requests from one or more client computers. The server computer 109(A) may comprise one or more computational apparatuses and may use any of a variety of computing structures, arrangements, and compilations for servicing the requests from one or more client computers.

The payment processing network 109 may include data processing subsystems, networks, and operations used to support and deliver authorization services, exception file services, and clearing and settlement services. An exemplary payment processing network may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system which performs clearing and settlement services. The payment processing network 109 may use any suitable wired or wireless network, including the Internet.

The authorization module 109(C) processes authorization request messages and determines the appropriate destination for the authorization request messages. Authorization module 109(C) may also be configured to insert data into authorization messages, such as a fraud score or a testing transaction score, before the messages are routed to the appropriate destination. The clearing and settlement module 109(D) handles the clearing and settlement of transactions. These modules authenticate user information and organize the settlement process of user accounts between the acquirer computer 108 and the issuer computer 111. An example of the clearing and settlement module is Base II, which provides clearing, settlement, and other interchange-related services to VISA members.

The routing module 109(E) handles the routing of authorization request messages from the acquirer computer 108 to the issuer computer 111, and the routing the authorization response messages back from the issuer computer 111 to the acquirer computer 108.

Figure 4:
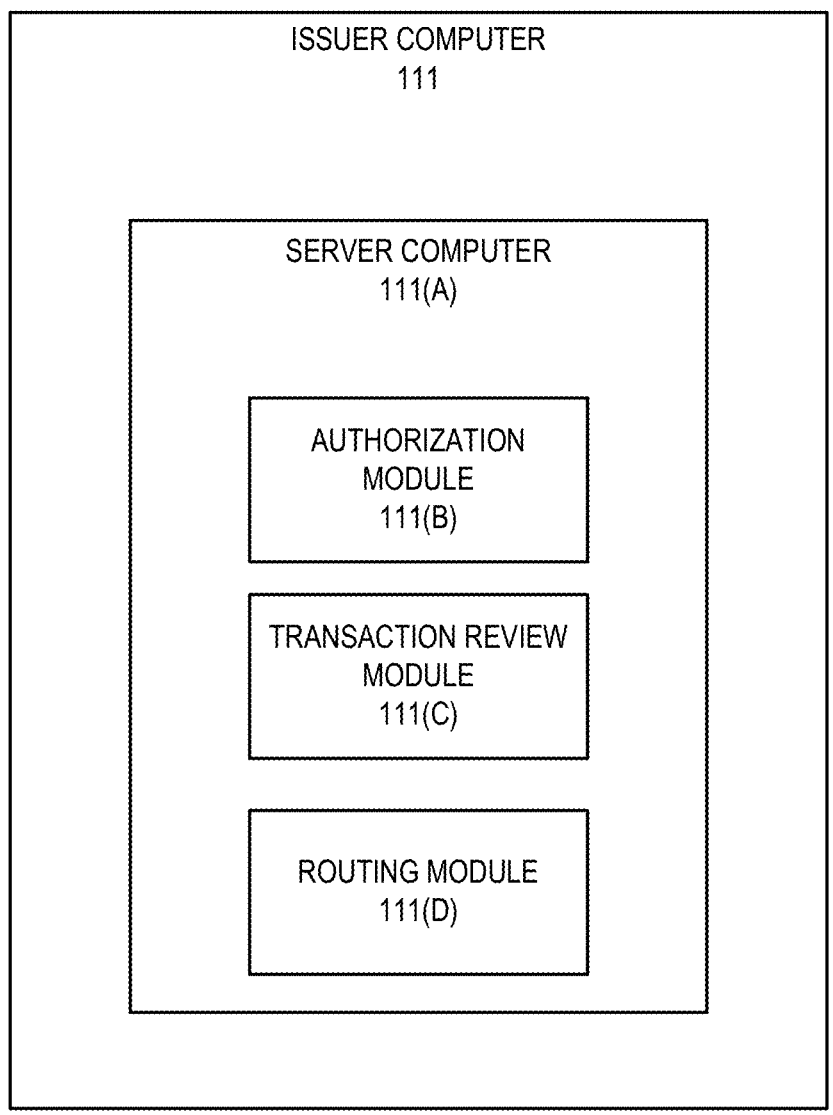
FIG. 4 shows an example of a payment processing network.

FIG. 4 shows an example of an issuer computer 111 according to some embodiments of the invention. Issuer computer 111 may comprise a server computer 111(A) comprising an authorization module 111(B), a transaction review module 120(C), and a routing module 111(D). The various modules may be implemented as computer code, residing on computer readable media.

The authorization module 111(B) may receive and process authorization request messages, and generate and send authorization response messages. The authorization module 111(B) may also determine the appropriate destination for the authorization request and response messages.

An "authorization request message" may include an electronic message that is sent to request authorization for a transaction. For example, the authorization request message can be sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may include an electronic message reply to an authorization request message. For example, the authorization response message may be generated by an issuing financial institution 111 or a payment processing network 109. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

The transaction review module 111(C) conducts a fraud evaluation for transactions. If the transaction review module 111(C) determines that the transaction may be fraudulent, the transaction review module 111(C) may determine that the transaction should be denied. If the transaction review module 111(C) determines that the transaction is not fraudulent, the transaction review module 111(C) may determine that the transaction should be allowed. If the transaction review module 111(C) is unable to determine whether the transaction is fraudulent, the transaction review module 111(C) can send the transaction for further review. In some embodiments, transaction review module 111(C) may communicate with fraud detection system 112 and/or encapsulate the functionality of fraud detection system 112.

The routing module 111(D) can route transactions to the appropriate destination. If a transaction is determined to be not fraudulent, the routing module 111(D) can route the message to the acquirer computer 108 for further processing. If the transaction is determined to be fraudulent, the routing module 111(D) can send the transaction back to the merchant computer 106. If the fraud evaluation conducted by the transaction review module 111(C) is indeterminate, the transaction can be routed to personnel for further review.

II. Exemplary Testing Transaction Classification Methods

Figure 5:
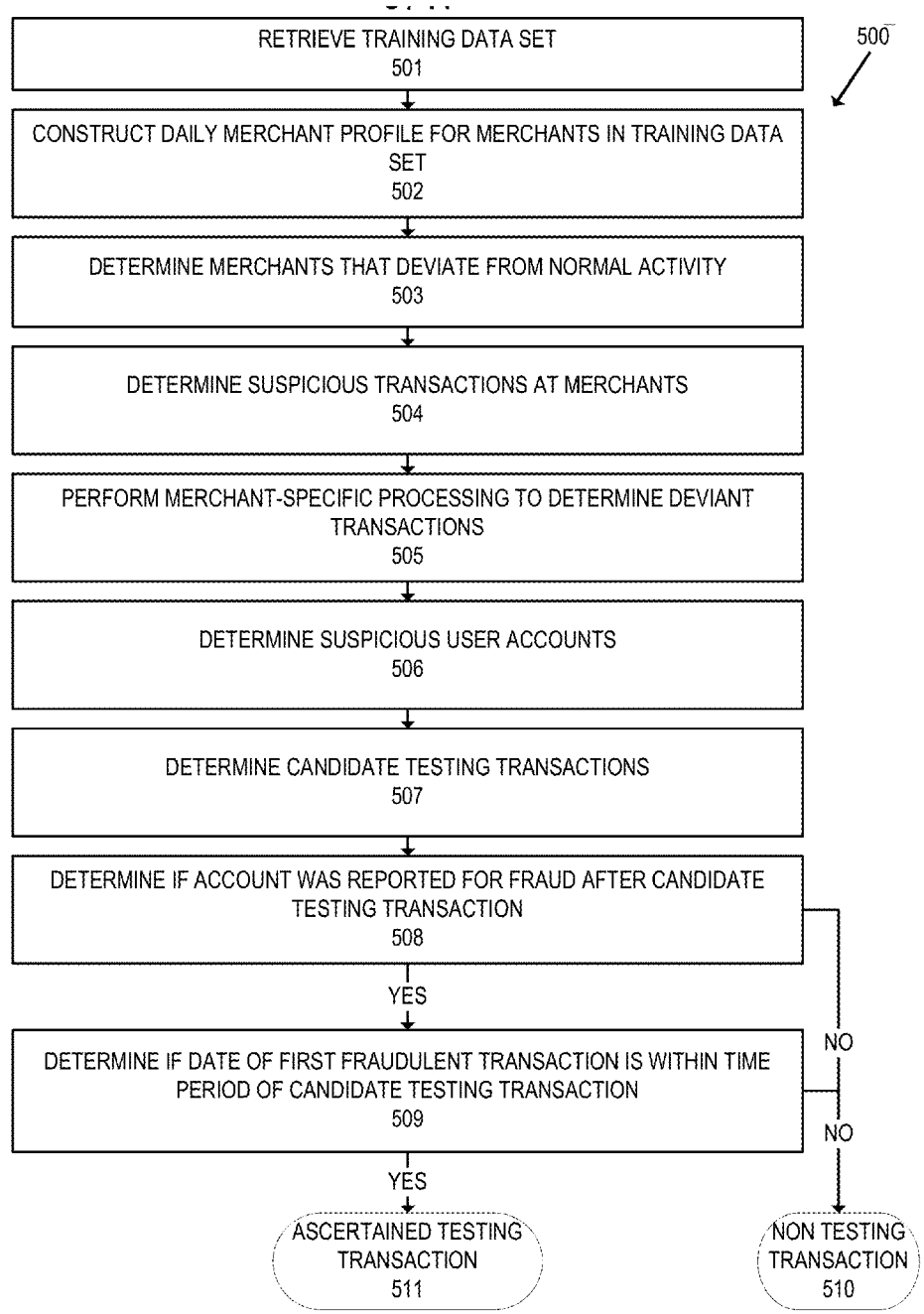
FIG. 5 shows a method of classifying a transaction as an ascertained testing transaction or as a non-testing transaction.

FIG. 5 shows a method 500 of classifying a transaction as an ascertained testing transaction or as a non-testing transaction. In some embodiments, it may be impractical or otherwise undesirable for manual human review of transactions to classify them as testing transactions or non-testing transactions. In such embodiments, method 500 may be used to automatically classify transactions in an efficient manner. In some embodiments, method 500 may be performed periodically as transactions are conducted using a payment system 100. In various embodiments, method 500 may be performed by any combination of payment processing network 109, transaction scoring computer 110, issuer computer 111, fraud detection system 112, and/or any other suitable entity.

At step 501, a training data set 110(H) is retrieved. Training data set 110(H) may include, for example, one or more transactions and various attributes of the transaction(s) (e.g., the account used, amount, MCC, time, date, etc.). In various embodiments, training data set 110(H) may include all transactions conducted using a payment system 100, or a subset of such transactions.

At step 502, a daily merchant profile for merchants in the training data set is constructed. The daily merchant profile may comprise a collection of transactions conducted at the merchant. The daily merchant profile may be used to review certain merchants for emerging testing transaction activity for each day. For example, the daily merchant profile for a merchant may include the average transaction amount, the average transaction volume (e.g., transactions per day), the number of unique customers, or any other suitable metric.

At step 503, merchants that deviate from normal activity are determined. In some embodiments, deviating merchants may be identified by a large change in the merchant's daily profile from one day to the next, or a large deviation of a merchant's profile when compared to similar merchants (e.g., merchants with the same merchant category code). For example, a small, recently established merchant with an unusually high volume of small-value transactions may be determined to deviate from normal activity. In some embodiments, prior detection of testing transactions may also be used to determine deviating merchants. For example, payment processing network 109 may identify merchants with a higher level of testing transaction activity than the average for all merchants.

At step 504, suspicious transactions at the merchants are determined. Suspicious transactions may be determined in any suitable manner. In some embodiments, a transaction may be determined to be a suspicious transaction if the transaction is a low value transaction using a payment account that merchant 105 had not previously encountered. For example, if a new user account was created with new payment information at an online retailer, a transaction conducted using the user account may be determined to be suspicious.

At step 505, merchant-specific processing is performed to determine deviant transactions. Merchant-specific processing may typically be performed for certain merchants for which the processing performed at step 504 may be undesirable. For instance, certain popular merchants may specialize in low-value transactions (e.g., iTunes™ and McDonalds™), and therefore the typical criteria used to determine suspicious transactions may lead to too many false negatives or false positives. Rather, merchant-specific processing may use specialized criteria for detecting suspicious transactions at a merchant. In some embodiments, the content of the transaction may be used. For example, if a small transaction was conducted on iTunes™, it may be determined whether the transaction used the usual iTunes account of user 101 or a different iTunes account. If the transaction was conducted using a different iTunes account created shortly before the transaction, the transaction may be determined to be suspicious. However, if the transaction was conducted using the usual iTunes account of user 101, the transaction may not be suspicious. This reflects the intuition that it is less likely for both a user's payment information and the user's iTunes account information to be compromised than solely the user's payment information.

At step 506, suspicious user payment accounts are determined. In some embodiments, determining suspicious user payment accounts may involve a "forward and backward" analysis of user payment accounts for which a suspicious transaction was identified. For example, if a suspicious transaction was identified during steps 504 or 505, other transactions conducted by the same payment account as the suspicious transaction may be retrieved. If the other transactions are also suspicious (e.g., indicative of testing activity), then the payment account may be determined to be suspicious. For example, if multiple suspicious transactions were conducted at several merchants using the payment account, the account may be determined to be suspicious.

At step 507, candidate testing transactions are determined from the set of suspicious testing merchants, accounts, dates, and transactions. In some embodiments, the determination of whether a transaction is a candidate testing transaction may be performed by a trained human analyst. In such embodiments, steps 501-506 may improve the efficiency of the review process by limiting the number of transactions that need to be manually reviewed. In other embodiments, candidate testing transactions may be determined automatically, such as by a testing model. For example, in embodiments where the testing model provides a score, e.g., between 1-100, indicating the likelihood that a transaction is a testing transaction, a transaction with a testing transaction score above a threshold (e.g., 80) may be determined to be a candidate testing transaction.

At step 508, it is determined whether an account used to conduct a candidate testing transaction was reported for fraud after the candidate testing transaction occurred. If the account was not reported for fraud, then the candidate testing transaction is determined to be a non-testing transaction.

If the account was reported for fraud, at step 509, it is determined whether the date of the first fraudulent transaction is within a predetermined time period of the candidate testing transaction. If the fraudulent transaction is within the predetermined time period, the transaction is determined to be an ascertained testing transaction. Otherwise, the transaction is determined to be a non-testing transaction.

For example, the time period may be 30 minutes, 1 hour, 1 day, 7 days, 14 days, 30 days, 60 days, 90 days, etc. Accordingly, if the predetermined time period is 7 days and a user reports that a fraudulent transaction was conducted 2 days after the candidate testing transaction, the transaction may be determined to be ascertained. However, if the user reports that a fraudulent transaction was conducted 120 days after the candidate testing transaction, then the transaction may be determined to be a non-testing transaction.

Method 500 as described above may be performed any number of times in order to determine a plurality of ascertained testing transactions and a plurality of non-testing transactions. In some embodiments, the resulting classified transactions may be stored in a training data set 110(H).

III. Exemplary Testing Model Generation Methods

Figure 6:
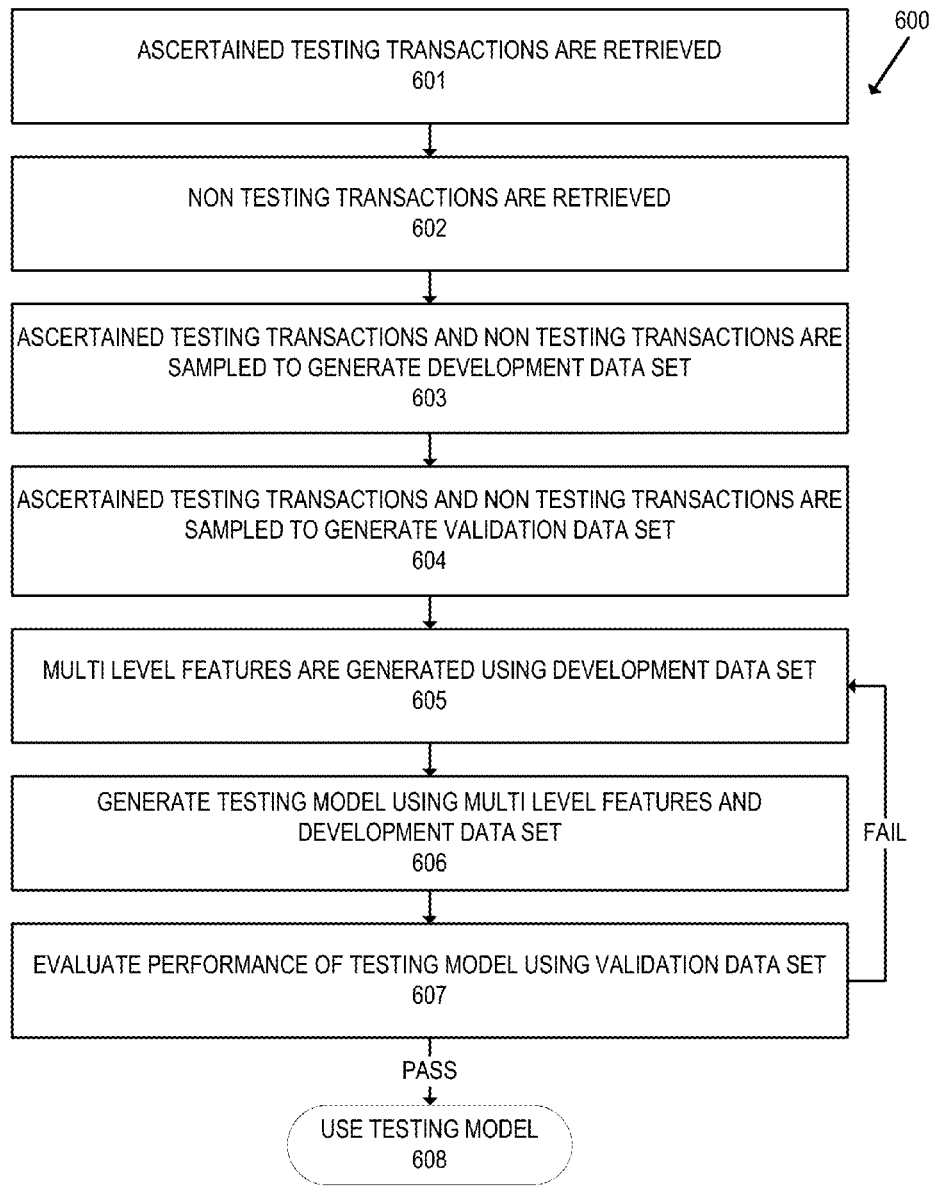
FIG. 6 shows a method of generating a testing model.

FIG. 6 shows a method 600 of generating a testing model. Method 600 may be performed once or periodically to ensure that the testing model reflects current fraud trends. Method 600 may be performed by any suitable entity, such as payment processing network 109, transaction scoring computer 110, issuer computer 111, and/or fraud detection system 112.

At step 601, ascertained testing transactions are retrieved. The ascertained testing transactions may be determined using any suitable method. For example, method 500 may be used to classify transactions as ascertained testing transactions or non-testing transactions. Transactions classified as ascertained testing transactions may be retrieved at step 601. Similarly, at step 602, non-testing transactions are retrieved. In some embodiments, the ascertained testing transactions and non-testing transactions may be retrieved from a training data set 110(H).

At step 603, the plurality of ascertained testing transactions and the plurality of non-testing transactions are sampled to generate a development data set. A "development data set" may comprise any suitable subset of ascertained testing transactions and non-testing transactions used to generate a testing model. The subset may be determined from the plurality of ascertained testing transactions determined in step 601, and the plurality of the non-testing transactions retrieved in step 602. In some embodiments, random sampling may be used to generate the development data set. In other embodiments, proportional sampling may be used to generate the development data set. In yet other embodiments, other statistical sampling techniques may be used to generate the development data set. Typically, the development data set should be generated so that the sampled ascertained testing transactions and non-testing transactions are representative of the overall population of transactions (e.g., all transaction conducted using the payment system 100).

Table 1 shows an example of a development data set. As shown in Table 1, the development data set comprises both ascertained testing transactions and non-testing transactions. In addition, for each transaction, the transaction amount and whether the transaction is a "Card Present" transaction (e.g., conducted using a physical card) or a "Card Not Present" transaction (e.g., conducted online or by phone) are noted.

TABLE 1

Development Data Set

| Transaction # | Testing? | Amount | CP? |
|---|---|---|---|
| 1 | Y | $ 4.67 | CNP |
| 2 | N | $ 126.43 | CNP |
| 3 | N | $ 57.32 | CP |
| 4 | N | $ 5.61 | CNP |
| 5 | N | $ 0.99 | CP |
| 6 | N | $ 78.13 | CNP |
| 7 | Y | $ 2.56 | CNP |
| 8 | Y | $ 4.98 | CNP |
| ... | ... | ... | ... |
| 1000 | N | $1066.23 | CP |

At step 604, the plurality of ascertained testing transactions and the plurality of non-testing transactions are further sampled to generate a validation data set. A "validation data set" may comprise any suitable subset of ascertained testing transactions and non-testing transactions used to validate or otherwise evaluate a testing model. As with the development data set, the subset may be determined from the plurality of ascertained testing transactions determined in step 601 and the plurality of the non-testing transactions retrieved in step 602. The sampling may be performed in any suitable manner, including those described in step 603 for the development data set. Typically, the total number of ascertained testing transactions and non-testing transactions (e.g., all transactions stored in the training data set 110(H)) may be partitioned between the development data set and the validation data set. For example, 40% of all testing and non-testing transactions may be included in the development data set, and the remaining 60% of testing and non-testing transactions may be included in the validation data set. Hence, in some embodiments, the validation data set may use a different subset of ascertained testing transactions and/or non-testing transaction than the ones used for the development data set. In some embodiments, some of the ascertained testing transactions and/or non-testing transaction may overlap between the validation data set and the development data set.

Table 2 shows an example of a validation data set in one embodiment of the invention. As shown in Table 2, the validation data set comprises the same fields as the development data set, but may include different transactions. In addition, in the shown example, the validation data set comprises more transactions (1500) than the development data set includes (1000).

TABLE 2

Validation Data Set

| Transaction # | Testing? | Amount | CP? |
|---|---|---|---|
| 1 | Y | $ 2.99 | CNP |
| 2 | N | $323.85 | CP |
| 3 | N | $ 3.66 | CNP |
| 4 | N | $ 19.87 | CNP |
| 5 | Y | $ 21.99 | CP |
| 6 | N | $462.63 | CP |
| 7 | Y | $ 4.11 | CNP |
| 8 | N | $ 9.75 | CP |
| ... | ... | ... | ... |
| 1500 | N | $ 35.65 | CNP |

At step 605, multi-level features are generated using the development data set. A "feature" may refer to any metric relating to a transaction. Examples of features may include a type of merchant associated with a transaction, a category of the item being purchased, previous transactions made by an account associated with the transaction, and a transaction velocity (frequency of use) of the account. In some embodiments, features may be discretized from a continuous transaction characteristic. For example, as shown in Table 3, a discretized transaction amount feature may take three values: a first value for transactions under $5, a second value for transactions between $5 and $100, and a third value for transactions over $100. As used herein, a "multi-level feature" may be any feature which is generated using one or more features. For example, a feature combining the category of item purchased with a discretized transaction amount may be a multi-level feature.

TABLE 3

Development Data Set (w/ Features)

| Transaction # | Testing? | Amount | CNP? |
|---|---|---|---|
| 1 | Y | <$5 | Y |
| 2 | N | >$100 | N |
| 3 | N | $5-$100 | Y |
| 4 | N | $5-$100 | Y |
| 5 | Y | <$5 | N |
| 6 | N | $10-$100 | N |
| 7 | Y | <$5 | Y |
| 8 | N | <$5 | N |
| ... | ... | ... | ... |
| 1500 | N | >$100 | Y |

Payment processing network 105 may generate multi-level features in any suitable manner. In some embodiments, feature generation may be performed manually. In other embodiments, feature generation may be performed automatically, such as by using statistical, data mining, or machine learning techniques.

At step 606, a testing model is generated using the multi-level features determined in step 605 and the development data set determined in step 603. In some embodiments, the testing model may be a Bayesian testing model. In such embodiments, Bayes' rule may be used to determine the conditional probability that a transaction is a testing transaction given a specific value for the features measured. In some embodiments, the probability may be calculated using the formula: $P(T|f)=(P(f|T)*P(T))/P(f)$, where $P(T)$ is the probability that a transaction is a testing transaction, $P(f)$ is the probability that a transaction has a specific value for the features, and where $P(f|T)$ is the conditional probability of the specific value of the features given that it is a testing transaction. The given formula may be used with the development data set to calculate $P(T|f)$: the conditional probability that a transaction is a testing transaction given that it has the specific value for the features. This probability may then be used to generate a testing transaction score.

For example, the development data set shown in Table 3 comprises two features: a discretized transaction amount, and an indicator of whether the transaction was Card Present or Card Not Present. For each combination of features, the number of transactions with that combination and the number of testing transactions with that combination may be determined. Table 4 shows these values and the resulting $P(T|f)$ for each possible combination of features.

TABLE 4

Summary of Development Data Set

| Row | Amount | CP? | # of Transactions | # of Testing Transactions | P(T|f) |
|---|---|---|---|---|---|
| 1 | <$5 | CP | 65 | 10 | .1538 |
| 2 | <$5 | CNP | 52 | 33 | .6346 |
| 3 | $5-$100 | CP | 338 | 9 | .02662 |
| 4 | $5-$100 | CNP | 234 | 14 | .05982 |
| 5 | >$100 | CP | 180 | 3 | .01667 |
| 6 | >$100 | CNP | 131 | 5 | .03817 |

For example, for card not present transactions with a transactions with an amount less than $10 (i.e., row 2), the summary of the development data set shown above in Table 4 may be used to determine the following probabilities. First, 7.4% of all transactions are testing transactions, since $(10+33+9+14+3+5)/1000=0.074$. Second, 5.2% of all transactions have a transaction amount less than $5 and are card not present transactions. Third, of the transactions that are testing transactions, about 44% are card not present transactions for less than $5. Based on the above three probabilities, $P(T|f)$ for a card not present transaction for under $5 can be expressed as: $(P(f|T)*P(T))/P(f)=(0.44*0.074)/(0.052)=0.6346$. Thus, according to the example testing model, there is an 63.5% likelihood that a new card not present transaction for less than $5 is a testing transaction. In one embodiment, if the testing transaction score is an integer between 0 and 100, the testing transaction score in this example would be 64. $P(T|f)$ for each combination of features is shown in Table 4.

In the example shown for Tables 1-4, the number of possible combinations (6) allows for the pre-computation of the testing transaction score for each combination. In some embodiments, it may be impractical or otherwise undesirable to pre-compute a testing transaction score for each combination. In such embodiments, the testing transaction score for a combination of features may be computed on demand (e.g., once a transaction with those features is received). Thus, calculation of a testing transaction score may be amortized over a large number of transactions.

In addition, it should be noted that although the example of Tables 1-4 shows only two features, embodiments of the invention are not so limited. Rather, any suitable number of features may be used to develop the testing model.

Furthermore, although step 606 is described herein as generating a Bayesian model, other models (e.g., support vector machines, decision trees, etc.) may be similarly used.

At step 607, the performance of the testing model is evaluated using the validation data set. In some embodiments, evaluation of the model may comprise calculating a confusion matrix and table of confusion or equivalent structure to measure the efficacy of the model. The confusion matrix may include the classification of the transaction by the testing model and the classification by a trusted source (e.g., an analyst or method 500). The true positive, false negative, false positive, and true negative rates when the testing model is applied to the validation data set may be determined from the confusion matrix. Table 5 shows an example of a confusion matrix for the running example.

TABLE 5

Confusion Matrix for Validation Data Set

|  |  | Predicted Class | |
|---|---|---|---|
|  |  | Testing | Non-Testing |
| Actual Class | Testing | 89 | 16 |
|  | Non-Testing | 34 | 1361 |

As shown above in Table 5, of the 105 actual testing transactions, the testing model successfully identified 89 of them, and incorrectly labeled 16 as non-testing transactions. In addition, of the 1395 non-testing transactions, the testing model successfully identified 1361 and misclassified 34 as testing transactions. Based on the above confusion matrix, the testing model has a sensitivity or true positive rate of 89/105, or about 84%, and a specificity or true negative rate of 1361/1395, or about 97.6%.

Evaluation of the model may also include a determination of the computational efficiency of the model. For example, the number of transactions classified per minute or the amount of computing resources (e.g., RAM and processor cycles) may be used to evaluate the model.

If the performance of the testing model is determined to be inadequate (e.g., the sensitivity or specificity are too low, or the resource usage is too high), method 600 may involve re-generating the testing model. Regenerating the testing model may include, for example, determining different features to be used in the model at step 605 or using a different type of model at step 606 (e.g., Bayesian or SVM). If the performance of the testing model is sufficient, at step 608 the testing model may be adopted for use in scoring transactions.

IV. Exemplary Transaction Scoring Methods

Figure 7:
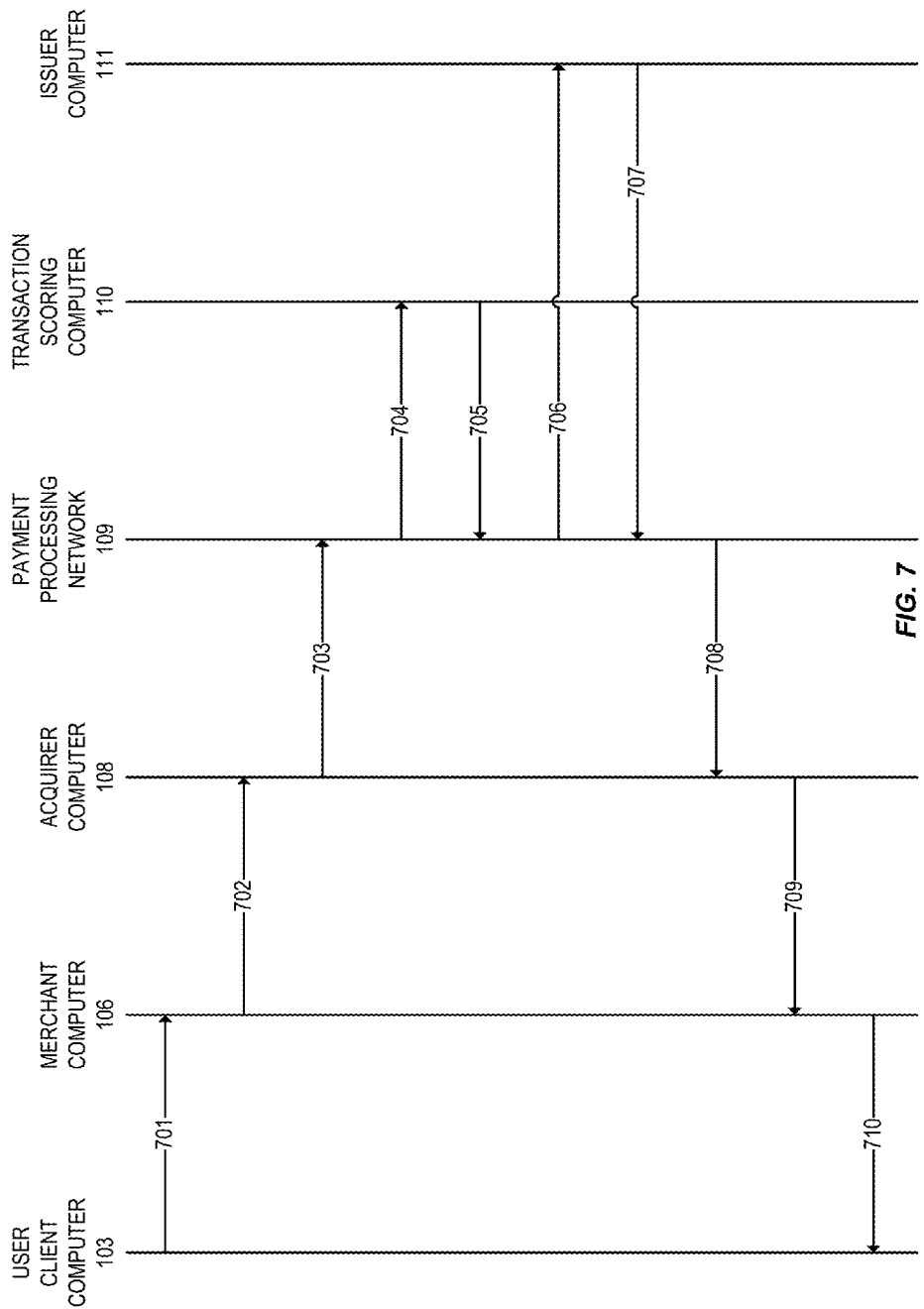
FIG. 7 shows a communication flow diagram illustrating communication between various entities in a system during a transaction.

FIG. 7 shows a communication flow diagram illustrating communication between various entities during a transaction in payment system 100 as shown in FIG. 1.

At step 701, in a typical transaction, user 101 engages in a transaction for goods or services at merchant 105 associated with merchant computer 106, optionally using user client computer 103 and/or user payment device 102 such as a credit card or mobile phone. For example, user 101 may use their Internet-enabled phone to access a merchant website to conduct a transaction using their user payment device 102. In other embodiments, user 101 may swipe the credit card through a POS terminal or, in another embodiment, may take a wireless phone and may pass it near a contactless reader in a POS terminal.

At step 702, merchant computer 106 receives the transaction from the user client computer 103 and may then transmit the transaction details to acquirer computer 108. Transactions details may be comprised of, but is not limited to, the following: user name, user billing address, user shipping address, user phone number, user account number, items purchased, price, etc. The transaction details may be included in an authorization request message for the transaction generated by merchant computer 106. The authorization request message may be generated in any suitable format.

An "authorization request message" may include an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

At step 703, acquirer computer 108 transmits the authorization message to payment processing network 109.

At step 704, after receiving the authorization request message, payment processing network 109 transmits transaction details from the authorization request message to transaction scoring computer 110. Transaction scoring computer 110 may then determine a testing transaction score for the transaction using a testing model (such as a testing model determined using method 600).

At step 705, the transaction scoring computer 110 returns to payment processing network 109 the testing transaction score for the transaction. In addition, in some embodiments, transaction scoring computer 110 may include an indication of whether the transaction should be approved or declined. In response, payment processing network 109 may decline the transaction.

At step 706, if the transaction is not to be declined, the authorization request message is forwarded to issuer computer 111 associated with user 101. The authorization request message may include the testing transaction score for the transaction.

Once issuer computer 111 receives the authorization request message, issuer computer 111 saves the transaction information and testing transaction score. Issuer computer 111 then determines whether the transaction should be authorized. The authorization determination may depend on, for example, the balance of the user's account, the testing transaction score, and/or the likelihood that the transaction is fraudulent. In addition, depending on the testing transaction score, the issuer may take preventative measures to prevent future fraud, such as marking the account as possibly compromised if the testing transaction score is higher than a threshold value.

At step 707, issuer computer 111 transmits to payment processing network 109 an authorization response message indicating whether the transaction is approved or declined. An "authorization response message" may include an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

At step 708, payment processing network 109 may optionally inspect the authorization response message and decline the transaction even if the transaction was approved by issuer computer 111. Payment processing network 109 then sends the authorization response message to acquirer computer 108.

At step 709, acquirer computer 108 sends the authorization response message to merchant computer 106. After the merchant computer 106 receives the authorization response message, at step 710, merchant computer 106 may then provide the authorization response message to user 101. For example, user 101 may be presented with a screen on user client computer 101 indicating success or failure of authorization. In other embodiments, the authorization response message may be displayed by the POS terminal, or may be printed out on a receipt.

At the end of the day or at a period determined by merchant 105, a clearing and settlement process can be conducted. A clearing and settlement process may include a process of reconciling a transaction. A clearing process is a process of exchanging financial details between an acquirer computer 108 and an issuer computer 111 to facilitate posting to a party's account and reconciliation of the party's settlement position. Settlement involves the delivery of securities from one party to another. In some embodiments, clearing and settlement can occur simultaneously. In some embodiments, clearing and settlement of a transaction may involve exchanging the testing transaction score for a transaction.

It should be noted that although some embodiments of the invention are described as shown in FIG. 7, embodiments are not limited to the specific communication flow shown in FIG. 7. For example, in some embodiments, the testing transaction scores for a transaction may be determined at some time after a payment processing network 109 forwards an authorization request for a transaction to issuer computer 111.

For instance, in one embodiment, a testing transaction score for a transaction may be generated when the authorization response message for the transaction is received by payment processing network 109. In such embodiments, the authorization indication provided by issuer computer 111 may be used as a feature in the testing model and used to determine the testing transaction score. In yet other embodiments, testing transaction scores for a plurality of transactions may be computed in a batch process (e.g., once per day). Computing testing transaction scores in a batch process may be advantageous because, for example, the batch process may use less computing resources than a real-time scoring of a transaction.

In addition, testing transaction scores may be provided to entities in any suitable manner. In some embodiments, if the transaction is scored upon receipt of an authorization response message by payment processing network 109, an auxiliary message with the testing transaction score for the transaction may be provided to issuer computer 111 and/or fraud detection system 112. In some embodiments, a batch file may be provided to an issuer computer 111 and/or fraud detection system 112 periodically (e.g., once per day). In such embodiments, the batch file may include testing transaction scores for each transaction scored during the period.

Figure 8:
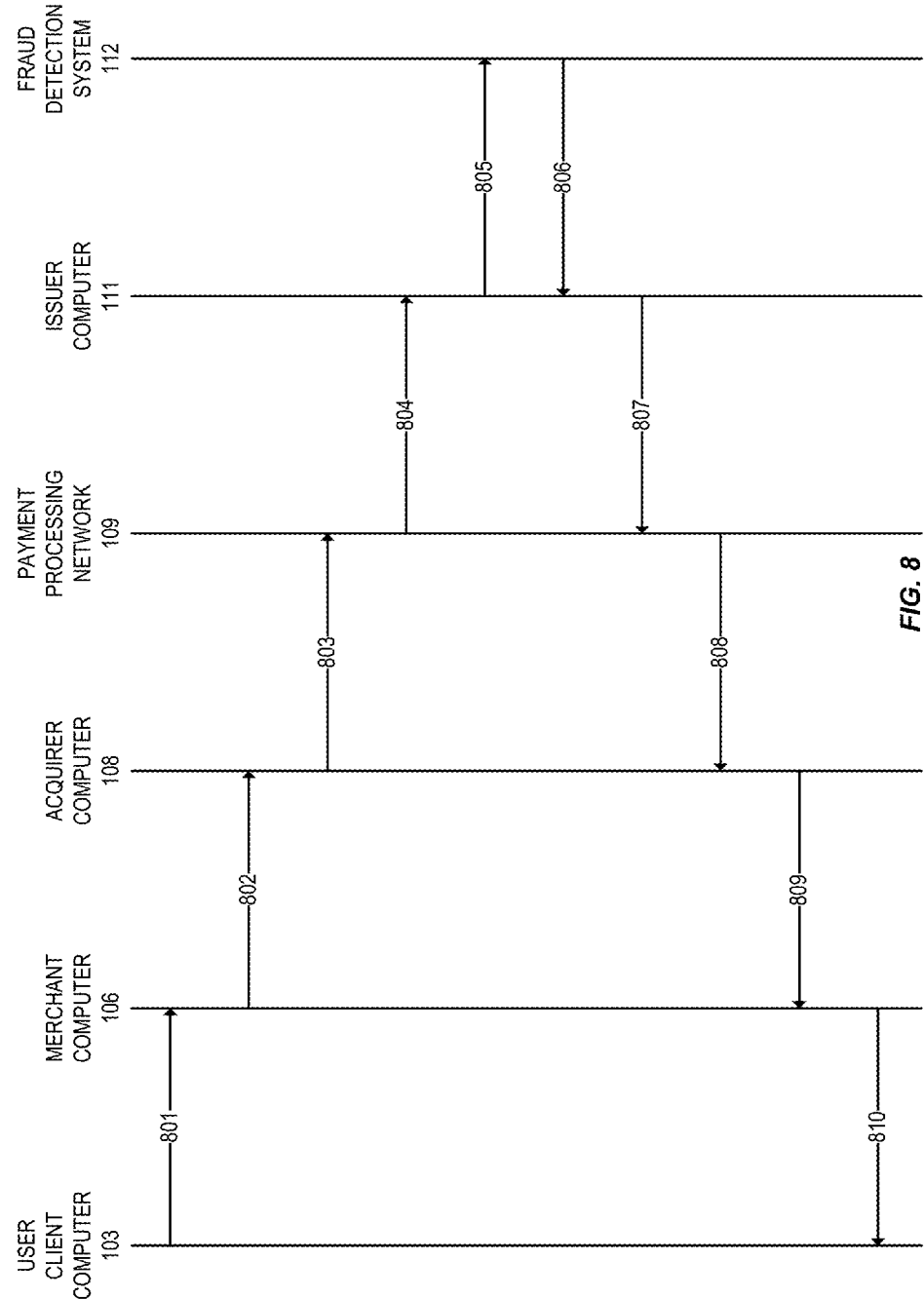
FIG. 8 shows a communication flow diagram illustrating communication between various entities in a system during a second transaction.

FIG. 8 shows a communication flow diagram illustrating communication between various entities in a system during a second transaction. The second transaction may occur at any time after the first transaction described in FIG. 7. As will be described below, a testing transaction score from the first transaction may be used to decline the second transaction.

At step 801, user 101 engages in the second transaction for goods or services at merchant 105 associated with merchant computer 106, optionally using user client computer 103 and/or user payment device 102 such as a credit card or mobile phone. Merchant 105 may not necessarily be the same merchant associated with the first transaction described in FIG. 7.

At step 802, merchant computer 106 receives the second transaction from the user client computer 103 and may then transmit the second transaction's details to acquirer computer 108. The transaction details may be included in an authorization request message for the transaction generated by merchant computer 106.

At step 803, acquirer computer 108 transmits the authorization message to payment processing network 109.

At step 804, payment processing network 109 forwards the authorization request message to issuer computer 111.

At step 805, issuer computer 111 forwards the transaction details from the authorization request message to fraud detection system 112. Once fraud detection system 112 receives the transaction details, fraud detection system 112 may evaluate the likelihood that the transaction is fraudulent. For example, if a prior transaction by the user's account was highly likely to be a testing transaction, and the present transaction is a high-value transaction, then the present transaction may be determined to be fraudulent. In contrast, if no previous testing activity is indicated, then the transaction may be determined to be non-fraudulent even if it is high-value. In some embodiments, the period of time since the likely testing transaction may be used in the fraud determination. For example, a high testing transaction score for a transaction conducted 5 days before the second transaction may indicate fraud to a greater degree than a high testing transaction score for a transaction conducted 90 days before the second transaction. In some embodiments, a time duration threshold may be defined during which a testing transaction score may cause a subsequent transaction to be determined as fraudulent.

At step 806, an indication of whether the transaction is fraudulent is provided from fraud detection system 112 to issuer computer 111. Issuer computer 111 may use the indication to determine whether to approve or decline the transaction.

At step 807, issuer computer 111 transmits to payment processing network 109 an authorization response message indicating whether the transaction is approved or declined.

At step 808, payment processing network 109 may optionally inspect the authorization response message and decline the transaction even if the transaction was approved by issuer computer 111. Payment processing network 109 then sends the authorization response message to acquirer computer 108.

At step 809, acquirer computer 108 sends the authorization response message to merchant computer 106. After the merchant computer 106 receives the authorization response message, at step 810, merchant computer 106 may then provide the authorization response message to user 101, concluding the transaction.

V. Exemplary Testing Model Update Methods

Figure 9:
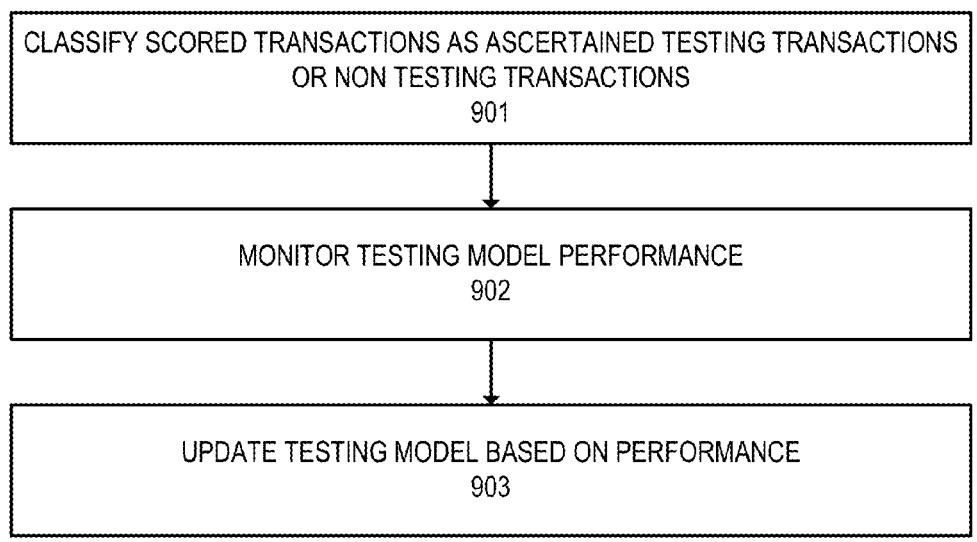
FIG. 9 shows a method of updating a testing model.

FIG. 9 shows a method 900 of updating a testing model in accordance with some embodiments of the invention. Typically, method 900 may be performed periodically as a testing model is used to score transactions in payment system 100. The scored transactions may reviewed at a later time and used to improve the testing model. Method 900 may be performed by any suitable entity, such as payment processing network 109, transaction scoring computer 110, issuer computer 111, or fraud detection system 112.

At step 901, scored transactions are classified as ascertained testing transactions or non-testing transactions. The classification may be performed by reviewing the transactions a certain time period (e.g., 90 days) after they are conducted. In some embodiments, the status of the user account that conducted the transaction may be retrieved. If the user account was marked as fraudulent within the time period, a transaction with a high testing transaction score may be classified as an ascertained testing transaction. Otherwise, if the user account is still active after the time period, the transaction may be determined to be a non-testing transaction. For example, if a user account that conducted a transaction with a high testing transaction score was reported as fraudulent 30 days after the transaction, then the transaction may be classified as an ascertained testing transaction. Conversely, if no fraud was reported on the user account, the transaction may be classified as a non-testing transaction.

At step 902, the performance of the testing model is monitored. In some embodiments, similar metrics (e.g., sensitivity and specificity) to those used to evaluate testing models (e.g., in step 607) may be used to monitor the testing models. For example, for each transaction that received a high testing transaction score, the classification of the transaction may be determined. If the transaction was determined to be an ascertained testing transaction at step 901, the transaction may be marked as a true positive. However, if the transaction was determined to be a non-testing transaction at step 901, the transaction may be marked as a false positive. Similarly, a transaction with a low testing transaction score may be marked as a true negative if no fraud was reported, but marked as a false negative if fraud was reported.

At step 903, the testing model is updated based on its performance. For example, if the testing model is a Bayesian classifier, the transactions classified in step 901 may be used to update the probabilities P(T), P(f), and P(T|f). In some embodiments, the newly classified transactions may replace the oldest transactions, so that the data set used for the Bayesian classifier remains the same size but is more recent.

In some cases, such as if the performance of the testing model is inadequate, embodiments may fully re-generate a testing model. In some such cases, method 600 may be performed to generate a testing model that has adequate performance.

Thus, embodiments of the invention allow the testing model to be automatically updated by leveraging the model's previous transaction scores and any report of fraud after the scoring of the transaction.

VI. Exemplary Computer Apparatuses

Figure 10:
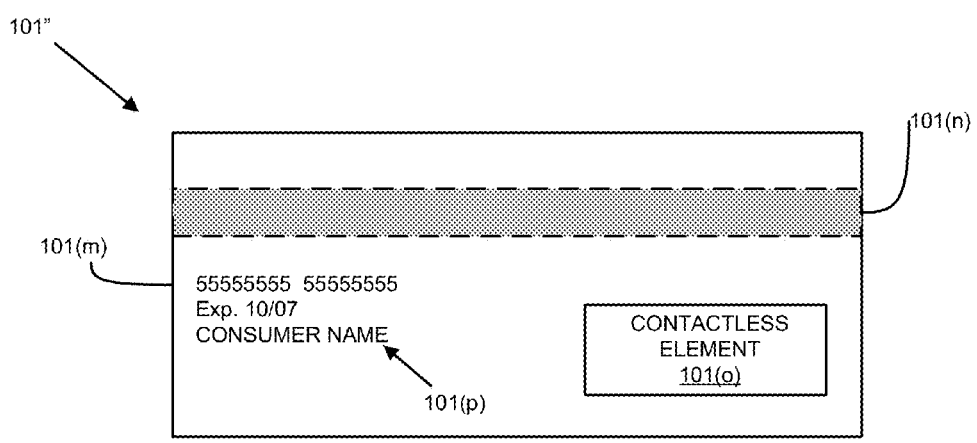
FIG. 10 shows an exemplary payment device in the form of a card.

FIG. 10 shows an example of a payment device 101" in the form of a card. As shown, the payment device 101" comprises a plastic substrate 101(m). In some embodiments, a contactless element 101(o) for interfacing with an access device 102 may be present on, or embedded within, the plastic substrate 101(m). Consumer information 101(p) such as an account number, expiration date, and/or a user name may be printed or embossed on the card. A magnetic stripe 101(n) may also be on the plastic substrate 101(m). In some embodiments, the payment device 101" may comprise a microprocessor and/or memory chips with user data stored in them.

As noted above and shown in FIG. 10, the payment device 101" may include both a magnetic stripe 101(n) and a contactless element 101(o). In some embodiments, both the magnetic stripe 101(n) and the contactless element 101(o) may be in the payment device 101". In some embodiments, either the magnetic stripe 101(n) or the contactless element 101(o) may be present in the payment device 101".

Figure 11:
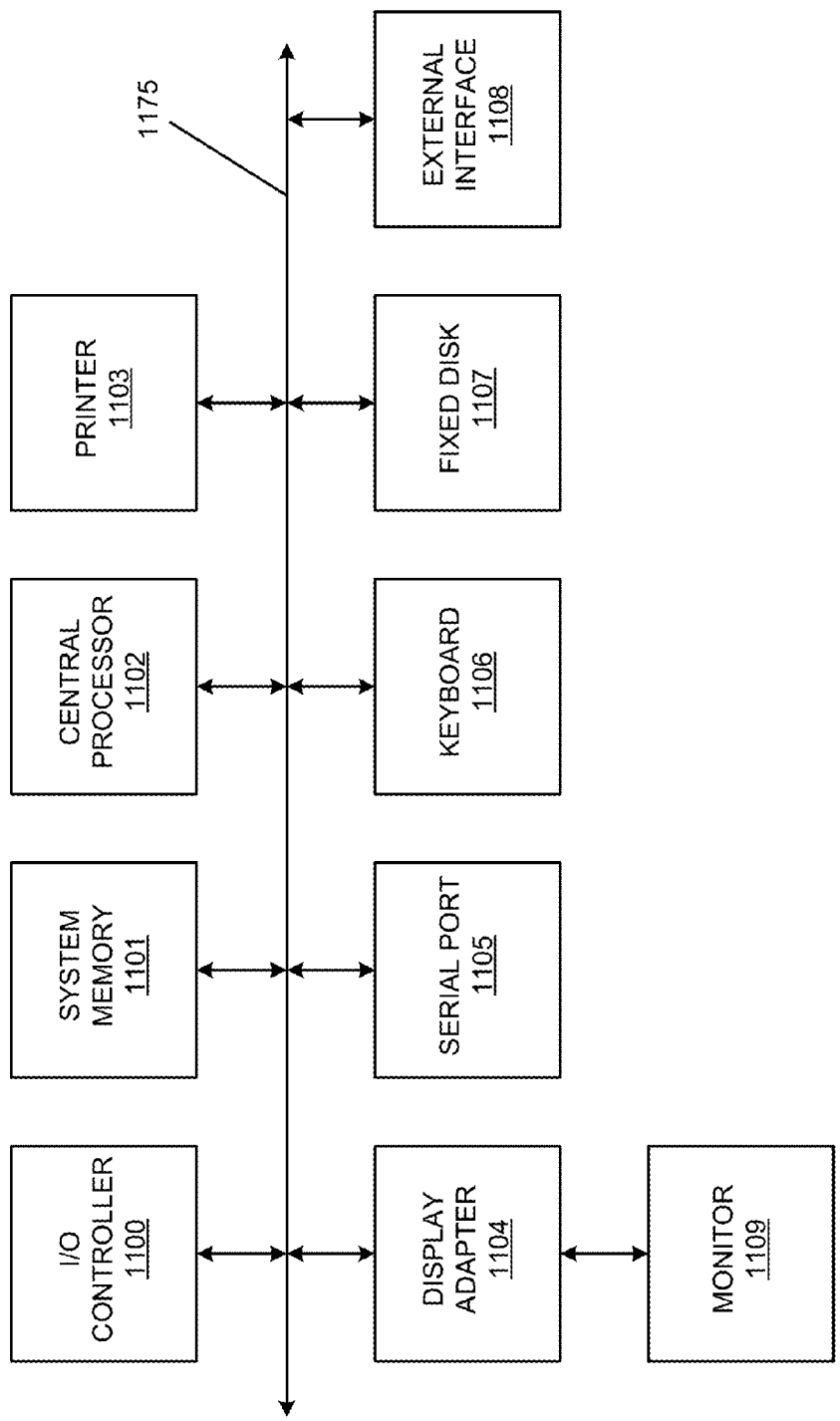
FIG. 11 shows a high level block diagram of a computer system that may be used to implement any of the entities or components described for embodiments of the invention.

FIG. 11 is a high level block diagram of a computer system that may be used to implement any of the entities or components described above. The subsystems shown in FIG. 11 are interconnected via a system bus 1175. Additional subsystems include a printer 1103, keyboard 1106, fixed disk 1107, and monitor 1109, which is coupled to display adapter 1104. Peripherals and input/output (I/O) devices, which couple to I/O controller 1100, can be connected to the computer system by any number of means known in the art, such as a serial port. For example, serial port 1105 or external interface 1108 can be used to connect the computer apparatus to a wide area network such as the Internet, a mouse input device, or a scanner. The interconnection via system bus 1175 allows the central processor 1102 to communicate with each subsystem and to control the execution of instructions from system memory 1101 or the fixed disk 1107, as well as the exchange of information between subsystems. The system memory 1101 and/or the fixed disk may embody a computer-readable medium.

VII. Additional Embodiments

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A server computer, comprising:
   a processor; and
   a non-transitory computer-readable medium, comprising code executable by the processor for implementing a method comprising:
   generating a development data set by sampling a first plurality of ascertained testing transactions and a first plurality of non-testing transactions, the first plurality of ascertained testing transactions including transactions for which fraud was reported within a predetermined time period;
   identifying, using one or more statistical analysis techniques, multiple features of the development data set based on the first plurality of testing transactions, the multiple features of the development data set being identified as being highly correlated to the first plurality of ascertained testing transactions and not highly correlated to the first plurality of non-testing transactions within the predetermined time period;
   generating at least one multi-level feature derived from a combination of the identified multiple distinct features, the multi-level feature being specific to the development data set;
   generating a testing model based at least in part on the at least one multi-level feature and the development data set, the testing model comprising a Bayesian model;
   receiving a first authorization message for a first transaction using an account;
   determining a testing transaction score for the first transaction using the testing model and based on a value for the multi-level feature associated with the first transaction, wherein the testing transaction score for the first transaction is determined in a batch process along with a plurality of other transactions;
   determining that the first transaction is a testing transaction based on the testing transaction score, the testing transaction being a transaction used by an unauthorized entity to test if the account is valid and usable for payment transactions;
   receiving a second authorization message for a second transaction using the account conducted after the first transaction; and
   declining the second transaction using the same account conducted after the first transaction based on the testing transaction score for the first transaction.

2. The server computer of claim 1, wherein the multiple features comprise at least one of:
   a fraud score,
   a type of merchant,
   a category of item,
   a transaction velocity,
   a transaction amount, or
   an authorization response code.

3. The server computer of claim 1, wherein the method further comprises:
   determining a validation data set by sampling a second plurality of ascertained testing transactions and a second plurality of non-testing transactions; and
   evaluating the performance of the testing model using the validation data set; and
   determining that the testing model exceeds a level of performance before using the testing model to determine the testing transaction score for the first transaction.

4. The server computer of claim 1, wherein each of the ascertained testing transactions is determined by:
   identifying a candidate testing transaction;
   determining that an account associated with the candidate testing transaction was reported for fraud after the candidate testing transaction occurred; and
   classifying that the candidate testing transaction as an ascertained testing transaction based on the reported fraud.

5. The server computer of claim 1, wherein the method further comprises:
   classifying the first transaction as an ascertained testing transaction; and
   updating the testing model using the first transaction.

6. The server computer of claim 1, wherein the testing transaction score is sent in an authorization request message to an issuer computer associated with the account.

7. The server computer of claim 1, wherein a batch file comprising testing transaction scores for a plurality of transactions is sent to an issuer computer associated with the plurality of transactions.

8. The server computer of claim 7, wherein the batch file is generated by subjecting the plurality of transactions to the testing model in a single batch.

9. The server computer of claim 1, wherein a Bayes' rule is used to determine the testing transaction score for the first transaction, and the testing transaction score represents a conditional probability that the first transaction is a testing transaction.

10. A computer-implemented method comprising:
    receiving, by a processor, a first authorization message for a first transaction using an account;

determining, by the processor, a development data set by sampling a first plurality of ascertained testing transactions and a first plurality of non-testing transactions, the first plurality of ascertained testing transactions including transactions for which fraud was reported within a predetermined time period;

identifying, using one or more statistical analysis techniques, multiple distinct features of the development data set based on the first plurality of ascertained testing transactions, the multiple distinct features of the development data set being identified as being highly correlated to the first plurality of ascertained testing transactions and not highly correlated to the first plurality of non-testing transactions within the predetermined time period;

generating, by the processor, one or more multi-level features derived from a combination of the identified multiple distinct features, the one or more multi-level features being specific to the development data set; and generating, by the processor, the testing model using the multi-level features and the development data set, the testing model comprising a Bayesian model;

determining, by the processor, a testing transaction score for the first transaction using a testing model and based on a value for the multi-level feature associated with the first transaction, wherein the testing transaction score for the first transaction is determined in a batch process along with a plurality of other transactions; and determining, by the processor, that the first transaction is a testing transaction based on the testing transaction score, wherein the testing transaction score for the first transaction is used for declining a second transaction using the account conducted after the first transaction, wherein the testing transaction score is determined prior to initiation of the second transaction.

11. The computer-implemented method of claim 10, wherein the multi-level features comprise at least one of:
   a fraud score;
   a transaction amount; and
   an authorization response code.

12. The computer-implemented method of claim 10, further comprising:
   determining, by the processor, a validation data set by sampling a second plurality of ascertained testing transactions and a second plurality of non-testing transactions;
   evaluating, by the processor, the performance of the testing model using the validation data set; and
   determining, by the processor, that the testing model exceeds a level of performance before using the testing model to determine the testing transaction score for the first transaction.

13. The computer-implemented method of claim 10, wherein each of the ascertained testing transactions is determined using a method comprising:
   identifying, by the processor, a candidate testing transaction;
   determining, by the processor, that an account associated with the candidate testing transaction was reported for fraud after the candidate testing transaction occurred; and
   classifying, by the processor, the candidate testing transaction as an ascertained testing transaction based on the reported fraud.

14. The computer-implemented method of claim 13, wherein the candidate testing transaction is classified as an ascertained testing transaction only when the fraud is reported within a predetermined time of the candidate testing transaction.

15. The computer-implemented method of claim 10, further comprising:
   classifying, by the processor, the first transaction as an ascertained testing transaction; and
   updating, by the processor, the testing model using the first transaction.

16. The computer-implemented method of claim 10, wherein the testing transaction score is sent in an authorization request message to an issuer computer associated with the account.

17. The computer-implemented method of claim 10, wherein a batch file comprising testing transaction scores for a plurality of transactions is sent to an issuer computer associated with the plurality of transactions.

* * * * *